United States Patent
Hatanaka et al.

(10) Patent No.: US 9,208,617 B2
(45) Date of Patent: Dec. 8, 2015

(54) SHAPE DATA GENERATION METHOD AND APPARATUS

(75) Inventors: Kohei Hatanaka, Kawasaki (JP); Toshiaki Hisada, Tokyo (JP); Seiryo Sugiura, Tokyo (JP); Takumi Washio, Tokyo (JP); Jun-ichi Okada, Tokyo (JP); Yoshimasa Kadooka, Kawasaki (JP); Takashi Iwamura, Kawasaki (JP)

(73) Assignees: FUJITSU LIMITED, Kawasaki (JP); THE UNIVERSITY OF TOKYO, Tokyo (JP)

( * ) Notice: Subject to any disclaimer, the term of this patent is extended or adjusted under 35 U.S.C. 154(b) by 226 days.

(21) Appl. No.: 13/483,495

(22) Filed: May 30, 2012

(65) Prior Publication Data
US 2013/0002677 A1 Jan. 3, 2013

(30) Foreign Application Priority Data
Jul. 1, 2011 (JP) .................. 2011-147078

(51) Int. Cl.
*G06T 11/20* (2006.01)
*G06T 19/20* (2011.01)

(52) U.S. Cl.
CPC .......... *G06T 19/20* (2013.01); *G06T 2219/2021* (2013.01)

(58) Field of Classification Search
CPC ....... G06T 11/40; G06T 11/203; G06T 17/00; G06T 11/001; G06T 11/00; G06T 11/006; G06T 7/0051; G06T 1/00; G06T 7/0083; G06T 7/0044; G06T 7/0048; G06T 7/606; G06T 15/50; G06T 15/80; G06T 1/60; G06T 15/40; G06T 2207/30101; G06T 2207/30172; G01N 21/9515

USPC .......................................................... 345/441
See application file for complete search history.

(56) References Cited

U.S. PATENT DOCUMENTS

| 5,444,838 | A | * | 8/1995 | Kommrusch et al. | ......... | 345/441 |
| 2002/0184470 | A1 | | 12/2002 | Weese et al. | | |

(Continued)

FOREIGN PATENT DOCUMENTS

| JP | 2002-329216 | 11/2002 |
| JP | 2010-61431 | 3/2010 |
| JP | 2011-200549 | 10/2011 |

OTHER PUBLICATIONS

Zheng et al., Four-Chamber Heart Modeling and Automatic Segmentation for 3-D Cardiac CT Volumes Using Marginal Space Learning and Steerable Features, Nov. 2008, IEEE Transactions on Medical Imaging, vol. 27, No. 11, pp. 1668-1681.*

(Continued)

*Primary Examiner* — Kee M Tung
*Assistant Examiner* — Yuehan Wang
(74) *Attorney, Agent, or Firm* — Staas & Halsey LLP

(57) ABSTRACT

A shape data generation method includes: identifying, from among a plural vertices of a first shape to be transformed, one or plural first vertices satisfying a predetermined condition including a condition that a normal line of a vertex to be processed crosses with a second shape that is a shape of a transformation target, which is identified from image data; transforming the first shape so as to move each of the one or plural identified first vertices a predetermined distance toward a corresponding normal direction of the identified first vertex; and storing data concerning the plural vertices of the transformed first shape after the identifying and the transforming are executed the predetermined number of times.

4 Claims, 13 Drawing Sheets

(56) References Cited

U.S. PATENT DOCUMENTS

| | | | |
|---|---|---|---|
| 2006/0094951 A1* | 5/2006 | Dean et al. | 600/407 |
| 2008/0118117 A1* | 5/2008 | Gauldie et al. | 382/128 |
| 2009/0287272 A1* | 11/2009 | Kokones et al. | 607/45 |
| 2011/0235883 A1* | 9/2011 | Nakagawa et al. | 382/131 |
| 2013/0127869 A1* | 5/2013 | Winnemoeller et al. | 345/441 |
| 2013/0132051 A1* | 5/2013 | Hadap et al. | 703/6 |

OTHER PUBLICATIONS

Fred L. Bookstein, et al., "Principal Warps: Thin-Plate Splines and the Decomposition of Deformations", IEEE Transactions on Pattern Analysis and Machine Intelligence. vol. 11, No. 6, pp. 567-585, Jun. 1989.

\* cited by examiner

SHAPE DATA GENERATION METHOD AND APPARATUS

CROSS-REFERENCE TO RELATED APPLICATIONS

This application is based upon and claims the benefit of priority of the prior Japanese Patent Application No. 2011-147078, filed on Jul. 1, 2011, the entire contents of which are incorporated herein by reference.

FIELD

This technique relates to a shape data generation method, a shape data generation apparatus and a shape data generation program.

BACKGROUND

In the medical field, simulators such as operation simulators, organ simulators and the like are used to determine treatment plans, perform diagnosis, predict postoperative conditions, develop medical supplies and equipment and the like. In the simulation using these kinds of simulators, 3-dimensional shape data of an organ is used, however, often the generation of the 3-dimensional shape data of the organ is not easy. This is because the organs are located inside the body, so visual observation and direct measurement of the organs are not possible, and the shapes of the organs are very complex, fundamentally.

The following two methods, for example, are known as methods for generating 3-dimensional shape data of the organs. First, (1) a first method is a method in which a doctor observes tomographic images such as Computer Tomography (CT) images, Magnetic Resonance Imaging (MRI) images or the like, sets the boundaries of each portion of the organ, and draws boundary lines. Also, (2) a second method is a method in which 3-dimensional shape data of a reference organ is prepared in advance, and by transforming that shape, the shape of the organ is obtained for each individual patient.

However, in the former method, there is a problem in which it is difficult to set boundaries, when the tomographic image is unclear due to unevenness in the contrast medium, operation scars and the like. Moreover, a doctor having knowledge and experience must draw boundary lines on hundreds of tomographic images, so the workload is large.

In regards to the latter method, transformation is carried out by correlating points in the reference shape with points in the target shape, however, there is a problem in which, if the points that are to be correlated are not set properly, the transformation cannot be carried out well.

As for the latter method, there exists a conventional technique such as described below. More specifically, a predicted shape model is expressed using triangular patches and the vertices of those patches; and for each triangular patch, observation data is searched for in the normal direction from the center of gravity of the triangular patch. When the observation data is found from this search, the predicted shape model is transformed by adding a force such that the center of gravity of the patch moves toward the observation data. However, in this technique, there was a problem in which, when normal lines cross, an unnatural shape will occur.

SUMMARY

This shape data generation method includes: (A) identifying, from among a plurality of vertices of a first shape to be transformed, one or plural first vertices satisfying a predetermined condition including a condition that a normal line of a vertex to be processed crosses with a second shape that is a shape of a transformation target, which is identified from image data; (B) transforming the first shape so as to move each of the one or plural identified first vertices a predetermined distance toward a corresponding normal direction of the identified first vertices; and (C) storing data concerning the plurality of vertices of the transformed first shape after the identifying and the transforming are executed the predetermined number of times.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
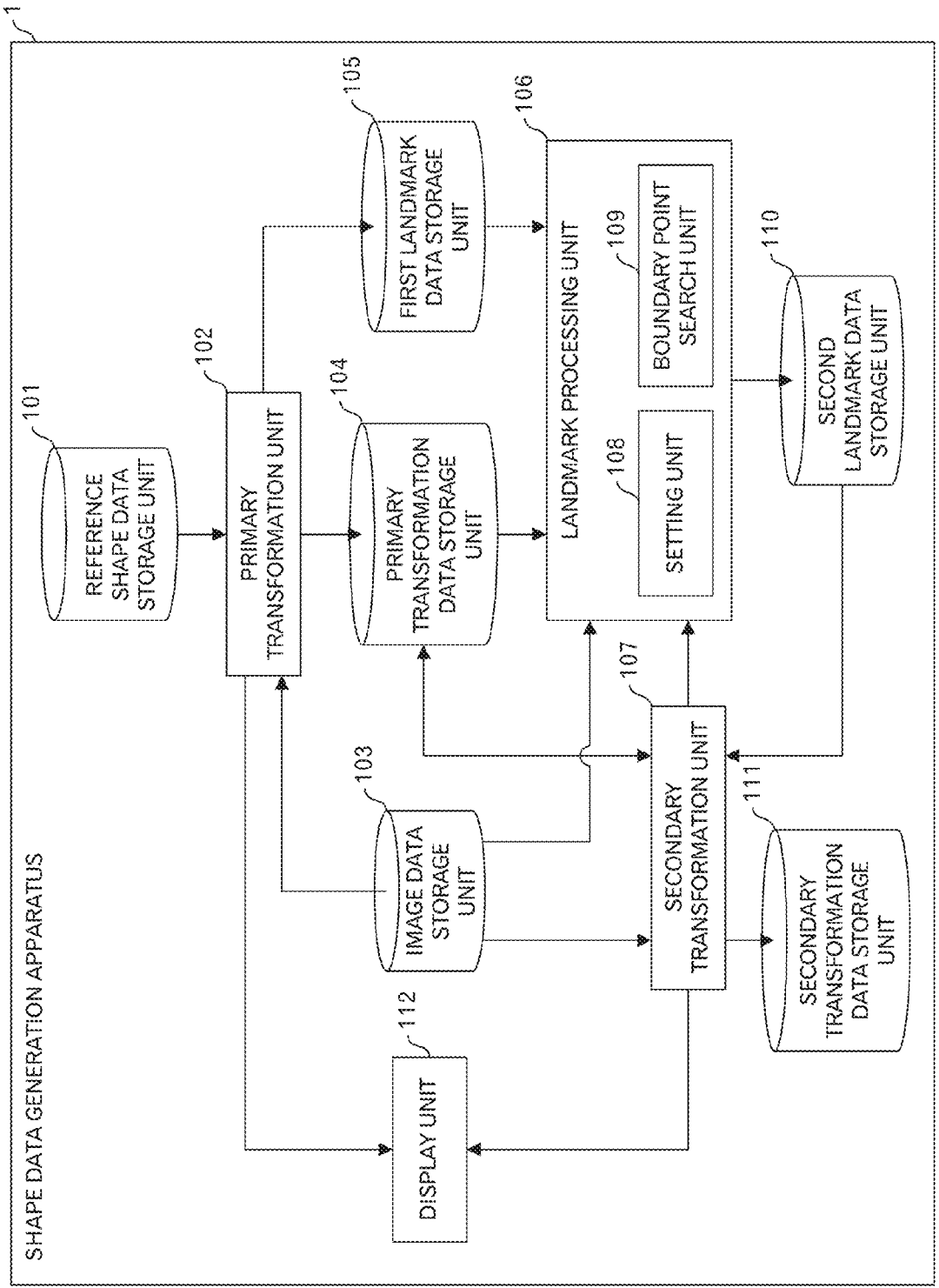
FIG. 1 is a functional block diagram of a shape data generation apparatus relating to this embodiment.

FIG. 1 illustrates a functional block diagram of a shape data generation apparatus 1 relating to this embodiment. In the example in FIG. 1, the shape data generation apparatus 1 includes: a reference shape data storage unit 101, a primary transformation unit 102, an image data storage unit 103, a primary transformation data storage unit 104, a first landmark data storage unit 105, a landmark processing unit 106, a secondary transformation unit 107, a second landmark data storage unit 110, a secondary transformation data storage unit 111, and a display unit 112. Moreover, the landmark processing unit 106 includes a setting unit 108 and a boundary point search unit 109.

The primary transformation unit 102 uses data that is stored in the reference shape data storage unit 101 and the image data storage unit 103 to carry out a primary transformation processing, which will be described later, and stores the transformation results in the primary transformation data storage unit 104 and first landmark data storage unit 105. Moreover, the primary transformation unit 102 instructs the display unit 112 to display a screen for causing a user to designate a landmark. The setting unit 108 uses data that is stored in the primary transformation data storage unit 104 and the first landmark data storage unit 105 to carry out a landmark setting processing described later, and stores the processing results in the second landmark data storage unit 110. The boundary point search unit 109 uses data that is stored in the image data storage unit 103, primary transformation data storage unit 104 and first landmark data storage unit 105 to carry out a boundary point search processing that will be described later. The secondary transformation unit 107 unit uses data that is stored in the image data storage unit 103, the primary transformation data storage unit 104 and second landmark data storage unit 110 to carry out a processing, and stores the processing results in the primary transformation data storage unit 104 or secondary transformation data storage unit 111. Moreover, the secondary transformation unit 107 instructs the display unit 112 to display the data that is stored in the secondary transformation data storage unit 111. The display unit 112 displays data on a display device in response to instructions from the primary transformation unit 102 and the secondary transformation unit 107.

The data for the reference shape of a heart is stored in the reference shape data storage unit 101. More specifically, Standard Triangulated Language (STL) data that contains information about the vertices of the shape and information about connections of vertices is stored. However, the data format is not limited to the format of the STL data.

Segment image data is stored in the image data storage unit 103. The segment image data is obtained by carrying out a processing for a CT image of a certain patient's heart to paint over the portion surrounded by the boundary at each site with different brightness values. By layering the segment data, 3-dimensional data for the target shape, which is the shape to which the transformation is made, is obtained.

Next, the operation of the shape data generation apparatus 1 that is illustrated in FIG. 1 will be explained by using FIGS. 2 to 17. In this embodiment, a transformation processing of a reference shape is carried out so as to come close to the target shape.

Figure 2:
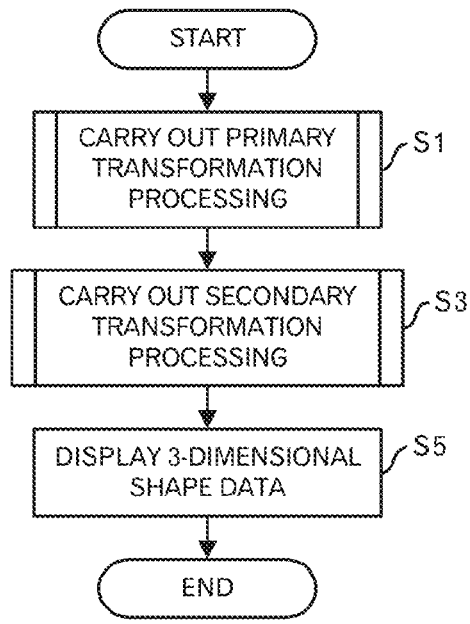
FIG. 2 is a diagram depicting a main processing flow of this embodiment.

First, the primary transformation unit 102 carries out the primary transformation processing (FIG. 2: step S1). The primary transformation processing will be explained by using FIGS. 3 to 6. In the primary transformation processing, rough alignment of the reference shape and target shape is carried out.

Figure 3:
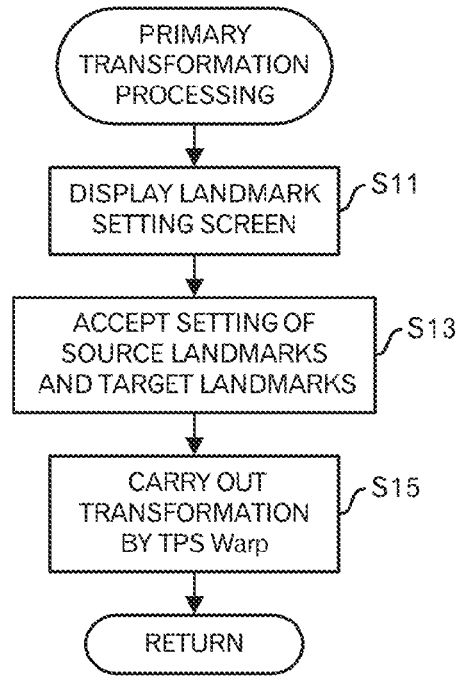
FIG. 3 is a diagram depicting a processing flow of a primary transformation processing.

First, the primary transformation unit 102 reads the reference shape data from the reference shape data storage unit 101, and reads the segment image data from the image data storage unit 103. Then, the primary transformation unit 102 instructs the display unit 112 to display a landmark setting screen that includes the reference shape data and segment image data. The display unit 112 displays the landmark setting screen on the display device in response to the instruction from the primary transformation unit 102 (FIG. 3: step S11).

The user watches the landmark setting screen that is displayed on the display device and carries out rough alignment of the reference shape and the target shape. More specifically, (1) the user sets source landmarks at predetermined positions in the reference shape. (2) The user then sets target landmarks at positions in the target shape, which correspond to the positions where the source landmarks are arranged. The predetermined positions are characteristic positions of the heart, for example, the four annular valves, apex, bottom section of the right ventricle fluid surface, myocardial boundary (for example, the boundary between the right ventricle and left ventricle), the end surfaces of the four pulmonary veins, and the inferior vena cava.

The primary transformation unit 102 then accepts settings for the source landmarks and target landmarks, and stores the data for the source landmarks and the target landmarks (for example, 3-dimensional coordinates) in the first landmark data storage unit 105 (step S13).

Then the primary transformation unit 102 carries out a processing, using a method such as the Thin Plate Spline (TPS) Warp method, which will be described later, to transform the reference shape according to the landmark data stored in the first landmark data storage unit 105 (step S15). The primary transformation unit 102 then stores the processing results, which are data of the shape after the primary transformation, in the primary transformation data storage unit 104. The processing then returns to the calling-source processing.

The format of the data stored in the primary transformation data storage unit 104 is the same as the format of the data that is stored in the reference shape data storage unit 101. Moreover, the source landmarks that were used in the primary transformation processing are handled as fixed points in the secondary transformation processing. In other words, the source landmarks that were used in the primary transformation processing do not move in the secondary transformation processing, and the positions are kept the same.

Figure 4:
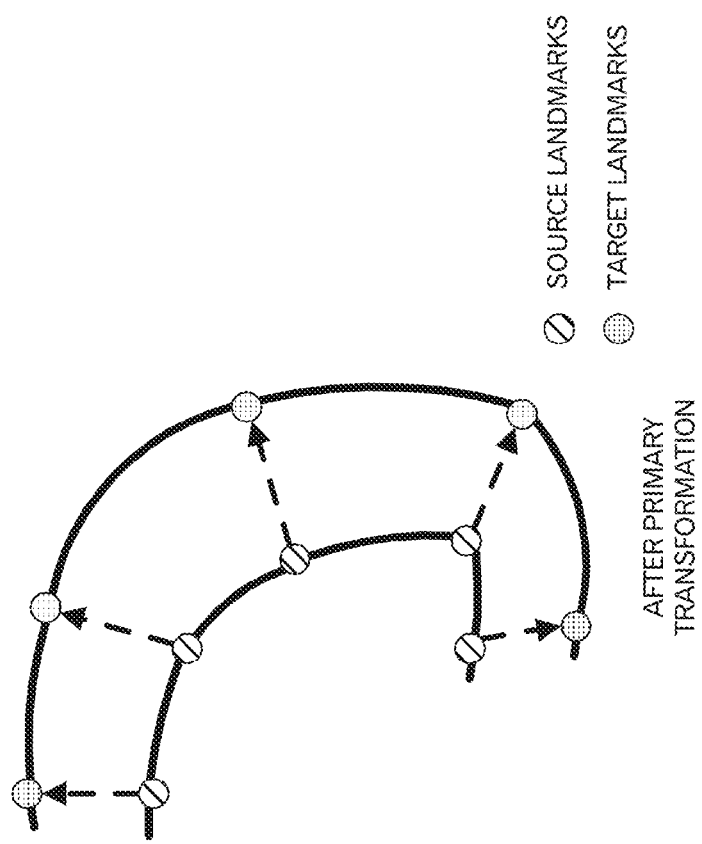
FIG. 4 is a diagram to explain TPS Warp.

Here, the TPS Warp method will be explained. As illustrated in FIG. 4, in TPS Warp, when the source landmarks and the target landmarks that correspond to the source landmarks are given, the transformation is carried out so that the source landmarks lay on the corresponding target landmarks. For details on the TPS Warp, refer to Fred L. Bookstein "Principal Warps: Thin-Plate Splines and the Decomposition of Deformations", IEEE TRANSACTIONS ON PATTERN ANALYSIS AND MACHINE INTELLIGENCE. VOL. 11 NO. 6, PP. 567-585, June 1989, for example. This document is incorporated into this specification by reference.

Figure 5:
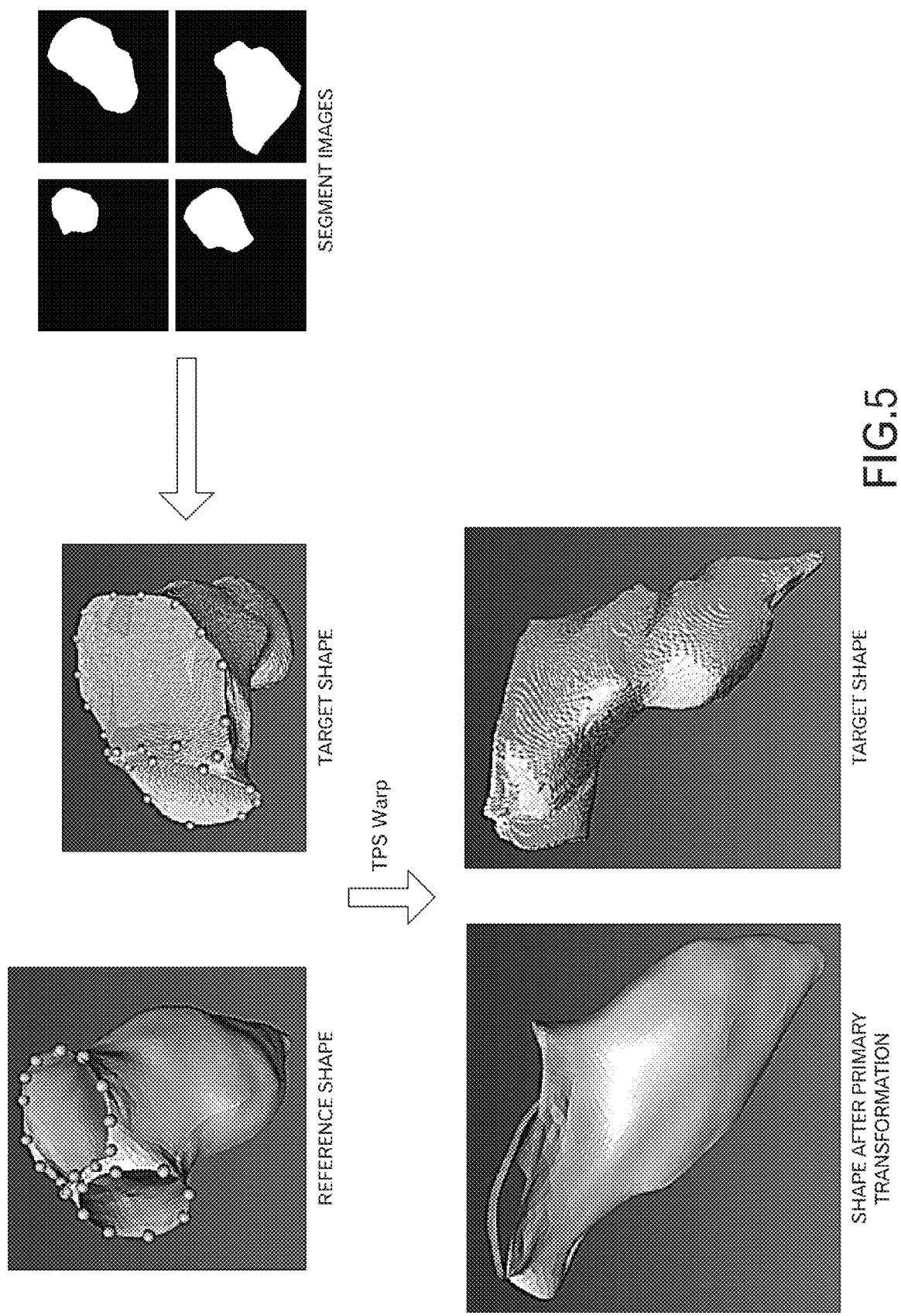
FIG. 5 is a diagram depicting an example that the primary transformation processing is applied to a left ventricle.

FIG. 5 illustrates an example of applying the primary transformation processing described above to the left ventricle. FIG. 5 illustrates the segment images, the target shape that is identified from the segment images, reference shape, and the shape after the primary transformation, which was generated by the primary transformation processing. The points attached to the reference shape are the source landmarks, and the points attached to the target shape are the target landmarks. By using the reference shape and target shape for which landmarks are set in this way to carry out the transformation processing according to the TPS Warp method, it is possible to obtain data of the shape after the primary transformation.

Figure 6:
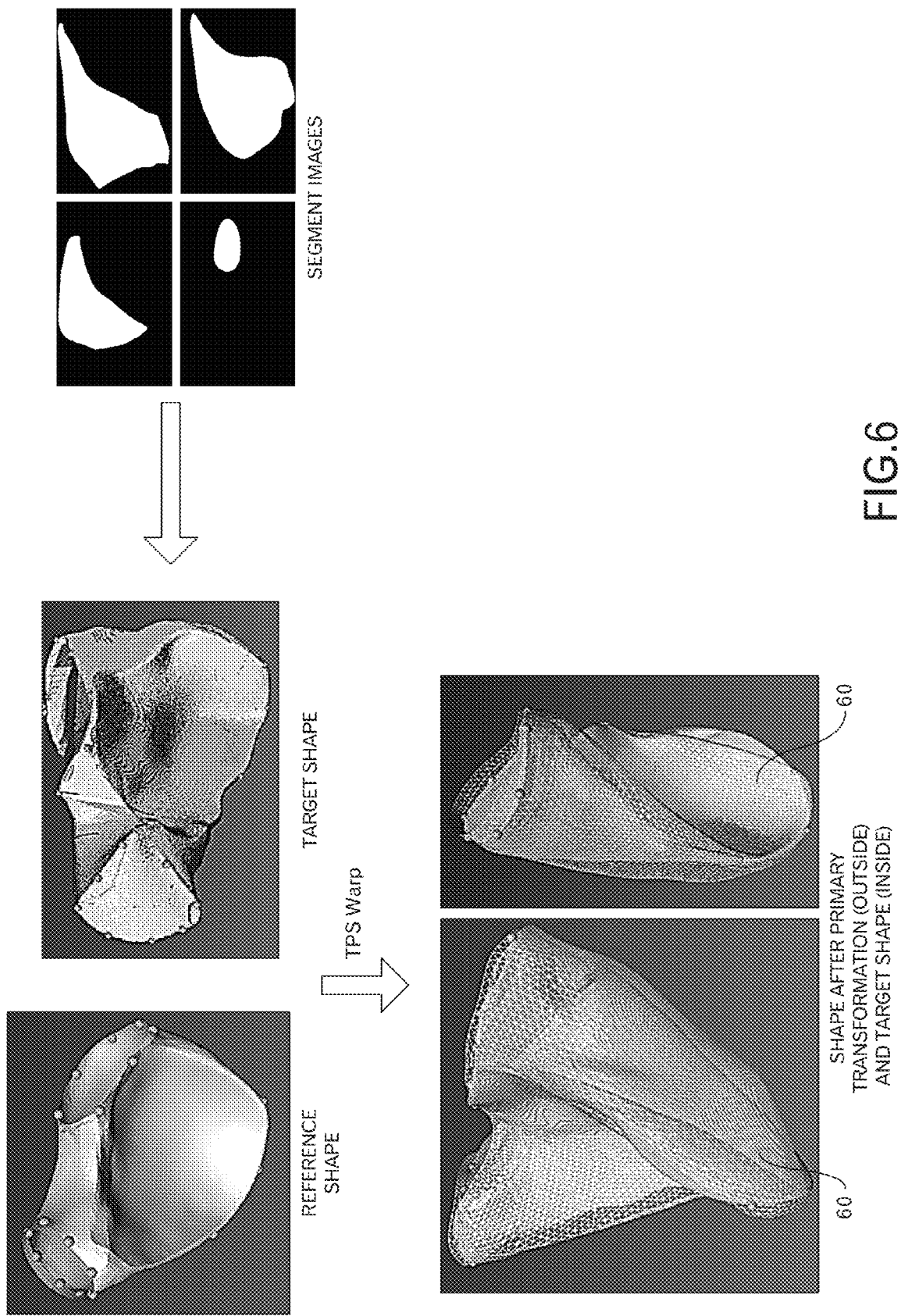
FIG. 6 is a diagram depicting an example that the primary transformation processing is applied to a right ventricle.

Moreover, FIG. 6 illustrates an example of applying the primary transformation processing described above to the right ventricle. FIG. 6 illustrates the segment images, the target shape identified from the segment images, the reference shape, and the shape after the primary transformation, which is generated by the primary transformation processing.

The points that are attached to the reference shape are the source landmarks, and the points that are attached to the target shape are the target landmarks. In the example in FIG. 6, the shape after the primary transformation is illustrated by meshed lines 60, so that it is easy to compare with the target shape which is depicted within the shape after the transformation.

As described above, by carrying out the rough alignment in advance according to the setting of the landmark settings, which are accepted from the user, it becomes possible to more effectively carry out the detailed transformation that will be carried out later.

Returning to the explanation of FIG. 2, the secondary transformation unit 107 carries out a secondary transformation processing (step S3). The secondary transformation processing will be explained using FIGS. 7 to 16.

Figure 7:
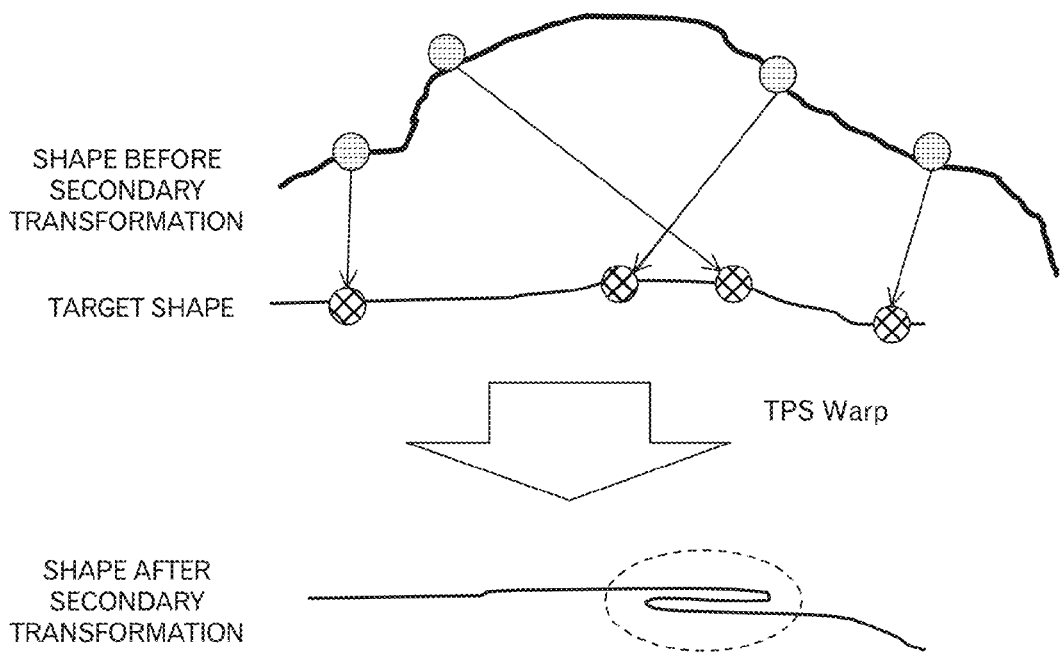
FIG. 7 is a diagram to explain a problem in case where target landmarks are placed on a target shape.

First, a summary of the secondary transformation processing will be given. In case where the transformation processing is carried out according to the TPS Warp method, when considering that typically the heart has a rounded shape, setting the target landmarks on the normal lines of the source landmarks is thought to be effective. For example, as illustrated in FIG. 7, it is considered that the transformation processing based on the TPS Warp method is carried out by placing the source landmarks on the shape before the transformation (i.e. shape after the primary transformation), and placing the target landmarks at the intersecting points between normal lines of the source landmarks and the target shape. However, when such a situation occurs that the normal lines cross as illustrated in FIG. 7, an unnatural portion that differs from the target shape may occur in the shape after the transformation.

Figure 8:
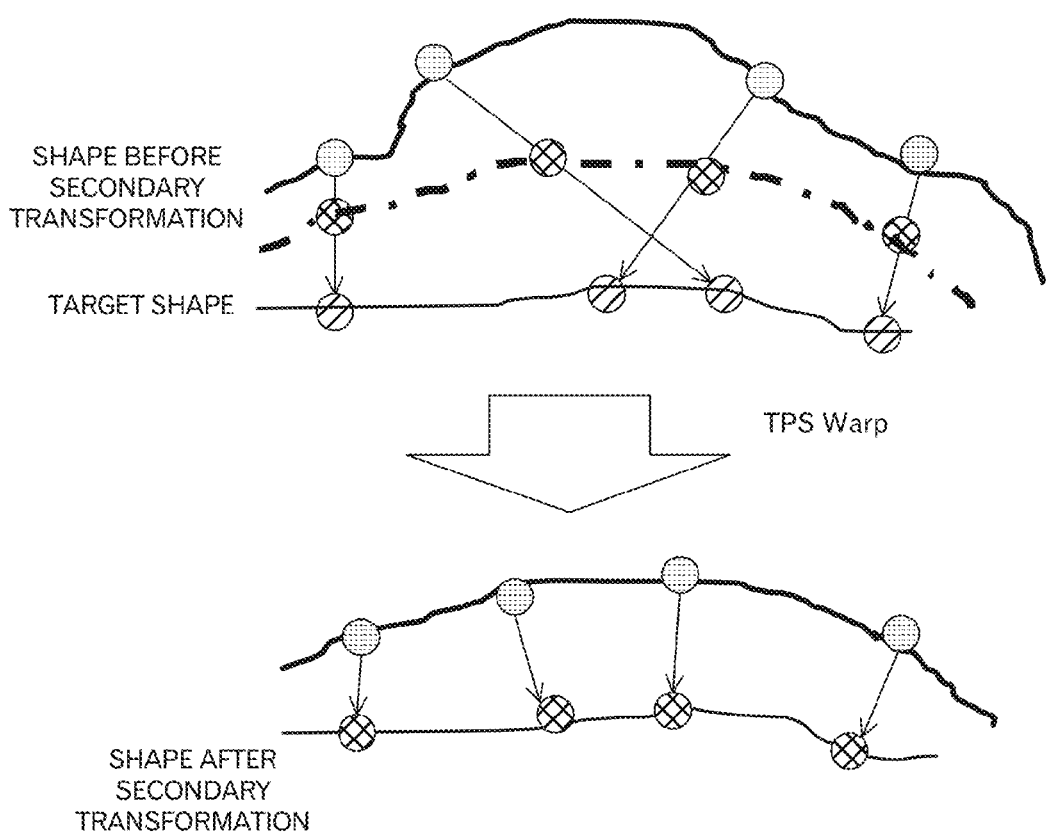
FIG. 8 is a diagram to explain an outline of a secondary transformation processing.

Therefore, in the secondary transformation processing in this embodiment, as illustrated in FIG. 8, the target landmarks are placed at points that internally divide the line segments that connect the source landmarks, which are placed on the shape before the transformation (i.e. shape after the primary transformation), with the aforementioned intersecting points, and then the transformation processing is carried out according to the TPS Warp method. Furthermore, by repeating such a transformation processing, the shape gradually approaches the target shape. In this way, an unnatural portion dose not easily occur in the shape after the transformation, and it becomes easier that the direction of the normal lines faces toward the portion that should be originally target.

Figure 9:
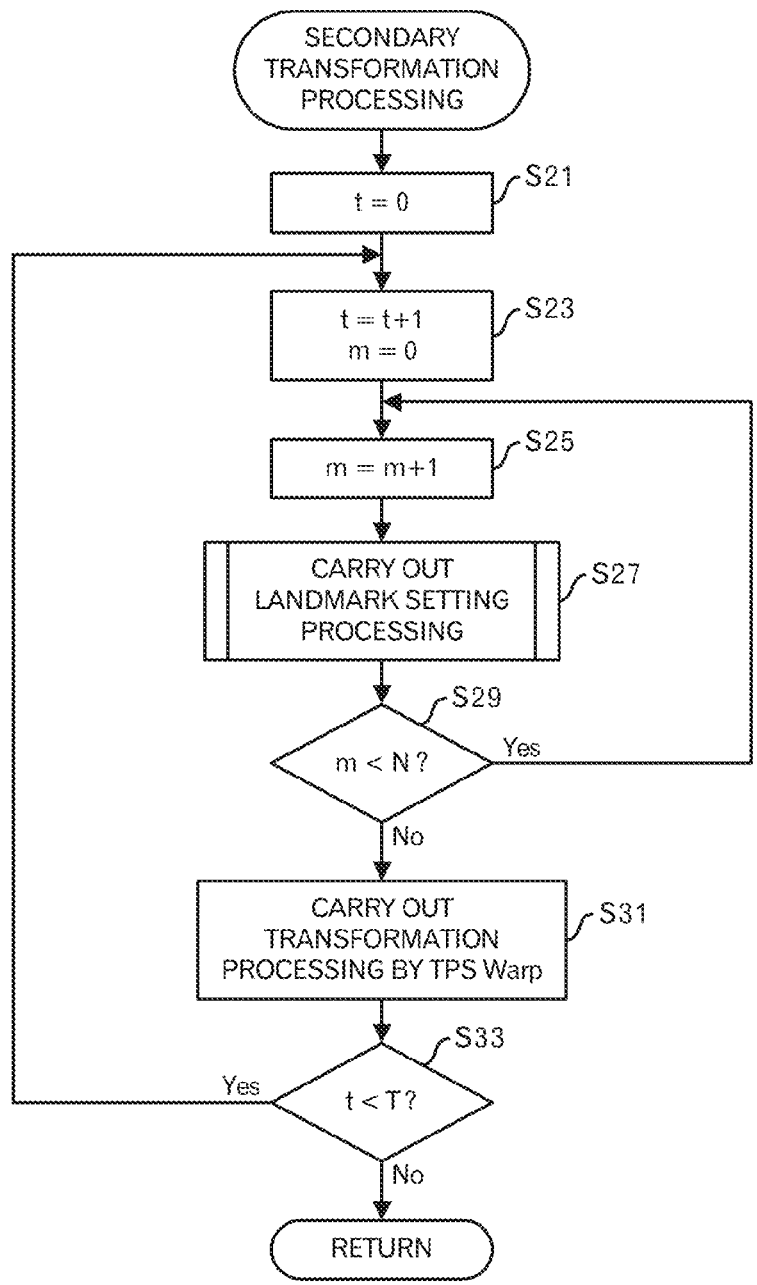
FIG. 9 is a diagram depicting a processing flow of the secondary transformation processing.

The secondary transformation processing will be explained in detail using FIGS. 9 to 16. First, the secondary transformation unit 107 sets the initial value of a variable t for counting the number of times of the transformations as t=0 (FIG. 9: step S21). Next, the secondary transformation unit 107 counts the number of times of the transformations by incrementing the variable t such that t=t+1, and sets the initial value of a variable m as m=0 (step S23). Here, m is a variable for counting the number of vertices that were processed.

The secondary transformation unit 107 then increases the variable m so that m=m+1 (step S25), and instructs the landmark processing unit 106 to carry out the landmark setting processing (step S27). The landmark setting processing will be explained using FIGS. 10 to 16.

Figure 10:
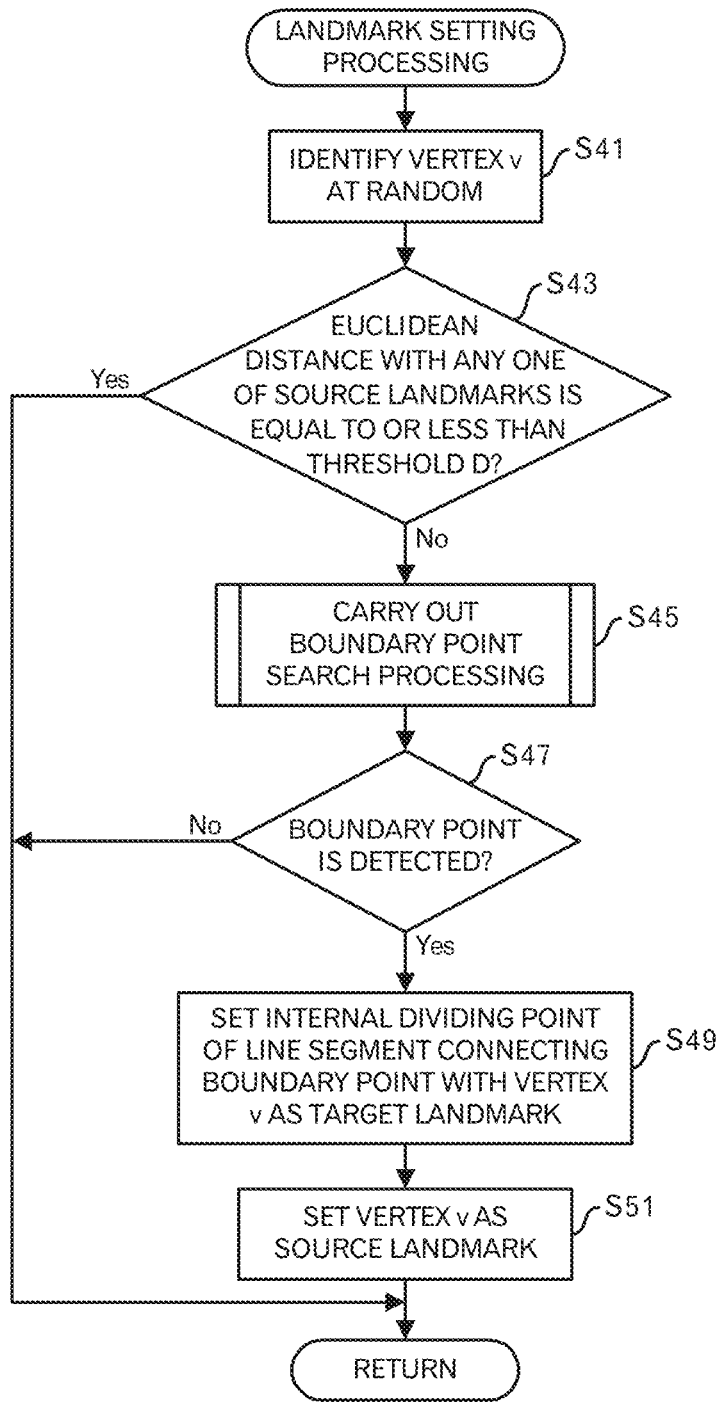
FIG. 10 is a diagram depicting a processing flow of a landmark setting processing.

First, the setting unit 108 of the landmark processing unit 106 identifies one vertex "v" at random from the data, which is stored in the primary transformation data storage unit 104 (FIG. 10: step S41). Then, the setting unit 108 uses the data of the source landmarks (in other words fixed points) that are stored in the first landmark data storage unit 105 and the data of the source landmarks that are stored in the second landmark data storage unit 110 to calculate the Euclidean distances between the vertex "v" and the respective source landmarks. Initially, the second landmark data storage unit 110 stores no data. Therefore, the source landmarks stored in the first landmark data storage unit 105 are used to calculate the distance. The setting unit 108 then determines whether or not the minimum distance of the Euclidean distances between the vertex "v" and the respective source landmarks is equal to or less than a threshold value D (step S43). The step S43 is a processing that is carried out for uniformly placing the vertex "v" on the shape before the secondary transformation processing. In other words, when the distances with other source landmarks are equal to or less than the threshold D, no new source landmarks are added. At the step S43, whether or not a following equation is satisfied is determined.

$$\min_i d(v, v_i) \le D.$$

Here, $d(v,v_i)$ indicates the Euclidean distance between the point "v" and the point "$v_i$". The point "$v_i$" is a fixed point (or in other words, is a vertex whose data is stored in the first landmark data storage unit 105 as a source landmark), or is a source landmark (a vertex whose data is stored in the second landmark data storage unit 110).

When it is determined that the minimum of the Euclidean distances between the vertex "v" and the respective source landmarks is equal to or less than the threshold value D (step S43: YES route), the processing returns to the calling-source processing. On the other hand, when it is determined that the minimum of the Euclidean distances between the vertex "v" and the respective source landmarks is greater than the threshold value D (step S43: NO route), the setting unit 108 instructs the boundary point search unit 109 to carry out a boundary point search processing. Then, the boundary point search unit 109 carries out the boundary point search processing (step S45). The boundary point search processing will be explained using FIGS. 11 to 16.

Figure 11:
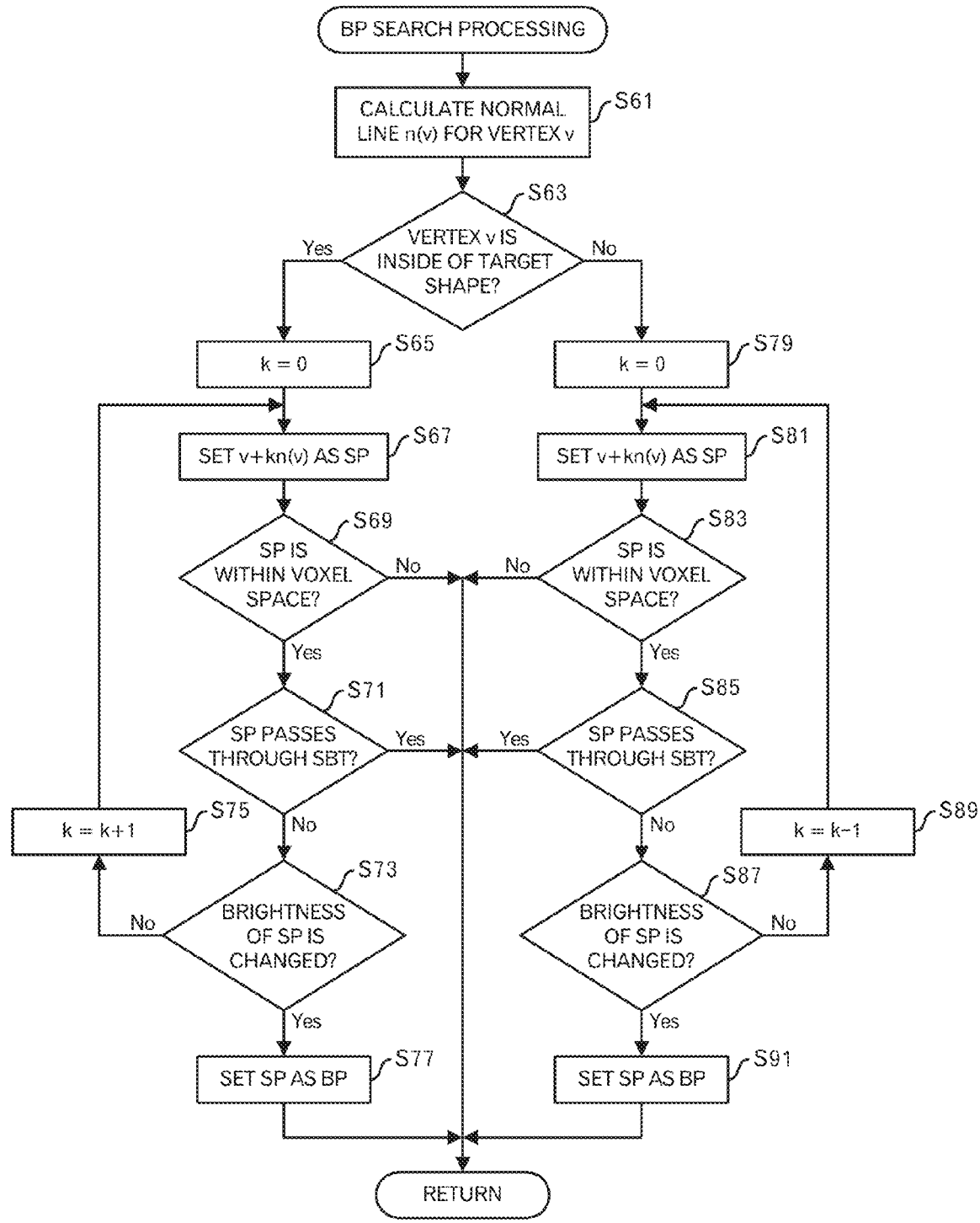
FIG. 11 is a diagram depicting a processing flow of a boundary point search processing.

First, the boundary point search unit 109 calculates the unit normal vector n (v) (FIG. 11: step S61). Here, n(v) is the normal unit vector with respect to the surface H at the vertex v(∈H). The unit normal vector is a normal vector with the length "1". H ($\subset$ V) is a shape surface that is specified by data stored in the primary transformation data storage unit 104, and V ($\subset R^3$) is a voxel space that is specified by the segment images. Moreover, $R^3$ represents a real number space. Here, for simplification, the pixel value of the segment image data is presumed to be one of the two values 0 or 1. However, the pixel value of the segment image data may be a value other than 0 or 1, or may be a value of two values or more. Moreover, a voxel is an element of a lattice image in the 3-dimensional image data, which corresponds to a pixel that is an element of a rectangular image in the 2-dimensional image data.

The boundary point search unit 109 also determines whether or not the vertex "v" exists inside a target shape (step S63). At the step S63, it is determined whether or not the following equation is satisfied.

$$f(v)>0$$

Here, mapping from the voxel space V to the real number space R (f: V→R) is defined as follows. According to this mapping f, the elements of the segment image data, which are included in the voxel space V, are correlated with the real number space R.

$$f(p)=I$$

Here, I is the brightness value of a voxel that includes a point p (∈V).

Figure 12:
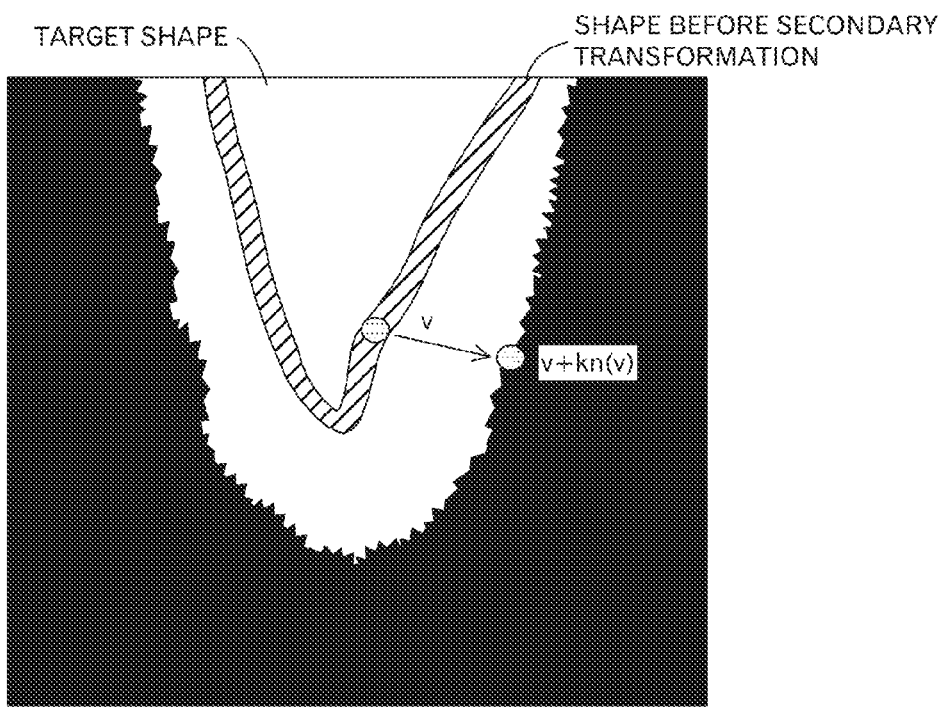
FIG. 12 is a diagram depicting a relationship between a position of a vertex "v" and a brightness value.
Figure 13:
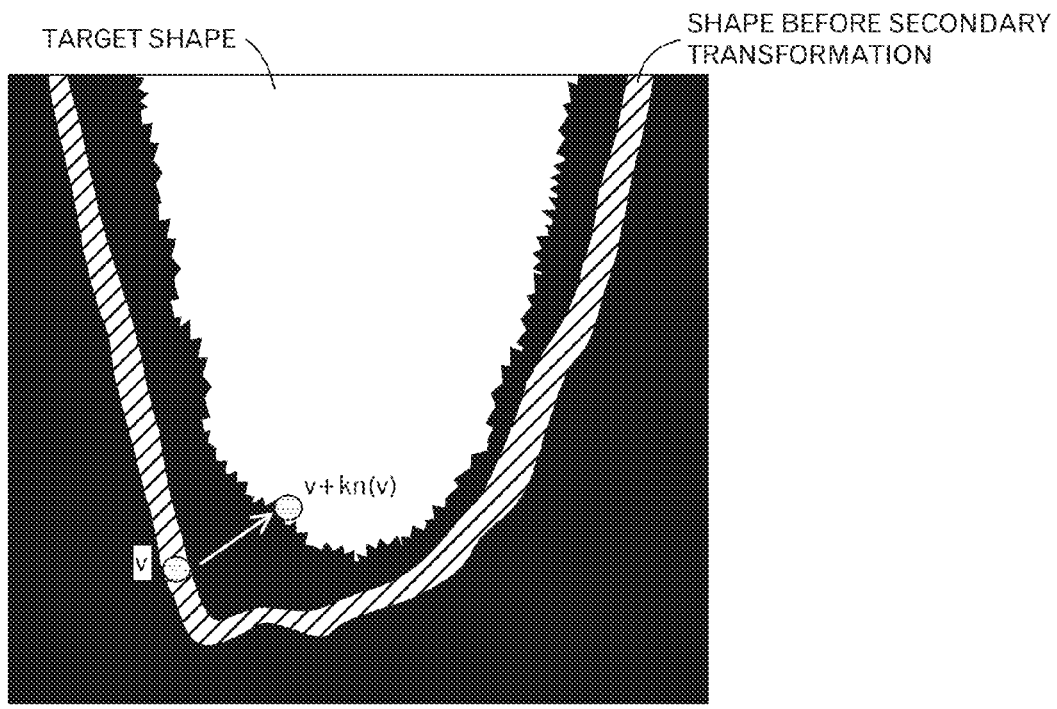
FIG. 13 is a diagram to explain the relationship between the position of the vertex "v" and the brightness value.

The processing at the step S63 will be explained using FIGS. 12 and 13. As illustrated in FIG. 12, when the brightness value f (v) in the voxel space, which corresponds to the vertex "v", is greater than 0, the vertex "v" is located on the inside of the target shape. Therefore, by setting a coefficient k in the processing at step S75, which will be described later, so as to be incremented by "1" at a time, the boundary point is searched for in the direction going toward the outside from the inside of the target shape. On the other hand, as illustrated in FIG. 13, when the brightness value f(v) in the voxel space, which corresponds to the vertex "v" becomes 0, the vertex "v" is located on the outside of the target shape. Therefore, by setting the coefficient k in the processing at step S89, which will be described later, so as to be decremented by "1" at a time, the boundary point is searched for in the direction going toward the inside from outside the target shape.

Then, when it is determined that the vertex "v" exists on the inside of the target shape (step S63: YES route), the boundary point search unit 109 sets the coefficient k as k=0 (step S65). In addition, the boundary point search unit 109 sets a point (hereafter referred to as a search point) for which a determination will be made as to whether or not the point is a boundary point as described below (step S67).

$$v+kn(v)$$

The boundary point search unit 109 then determines whether or not the search point exists inside the voxel space specified by the tomographic image data (step S69). At the step S69, it is determined whether or not the following equation is satisfied.

$$v+kn(v) \in V$$

When it is determined that the search point does not exist inside the voxel space specified by the tomographic image data (step S69: NO route), the processing returns to the calling-source processing. This is because the search point has reached outside the voxel space, so it is possible to determine that the normal line for the vertex "v" does not cross the target shape.

On the other hand, when it is determined that the search point exists inside the voxel space that is specified by the tomographic image data (step S69: YES route), the boundary point search unit 109 determines whether or not the search point passed through the shape before the transformation (step S71). At the step S71, it is determined whether or not the following equation is satisfied.

$$(g(v), g(v+kn(v))) < 0$$

Here, mapping g: V→R³ is defined as follows. This mapping g correlates the elements of the segment image data that is included in the voxel space V with the real number space R³.

$$g(p) = \begin{cases} n(p) & (\text{if } p \in H) \\ 0 & (\text{if } p \notin H) \end{cases}$$

Be aware that the limit $g|_H$ of the mapping g becomes n(v).

Figure 14:
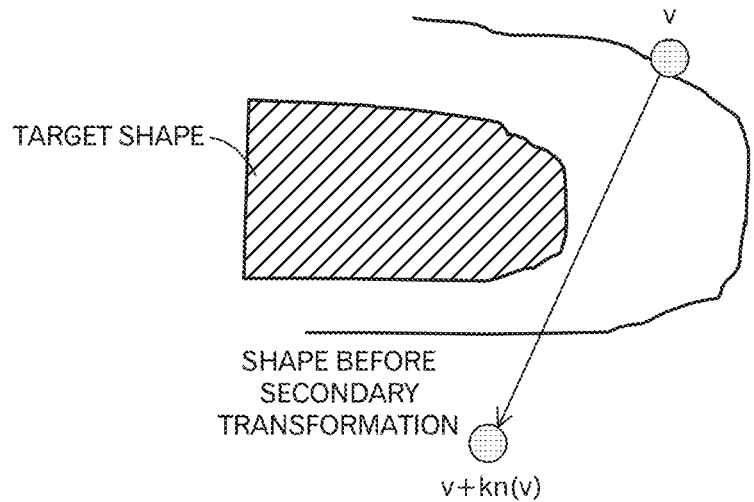
FIG. 14 is a diagram depicting an example of a case where the search point passes through a shape before the transformation.
Figure 15:
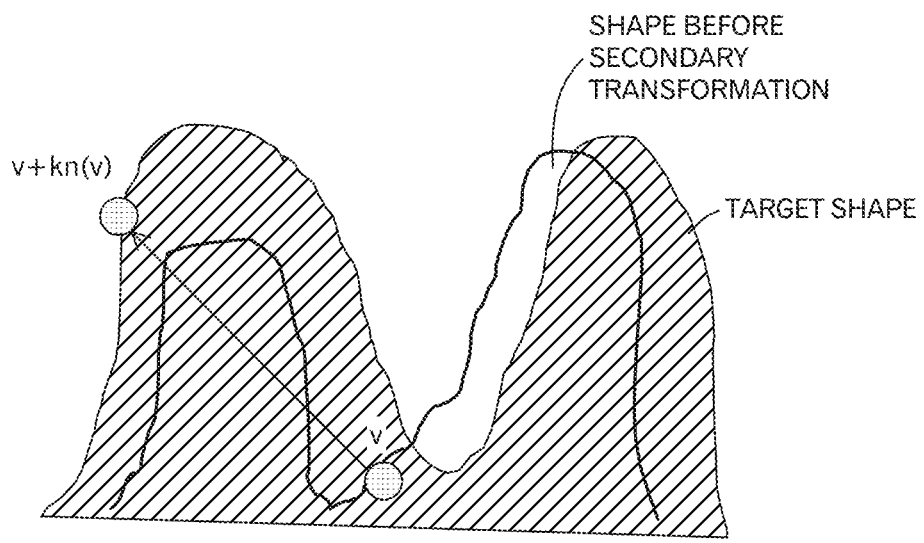
FIG. 15 is a diagram depicting an example of the case where the search point passes through the shape before the transformation.

The processing of the step S71 will be explained using FIGS. 14 and 15. When the search point passes through the shape before the transformation before reaching the boundary point, there is a possibility that searching for the boundary point is not carried out properly. For example, the case where the search point passes through the shape before the transformation before reaching the boundary point may be the case illustrated in FIG. 14 or the case illustrated in FIG. 15. In other words, there is a case where the boundary point does not exist in the search direction according to the extent of the transformation of the target shape with respect to the shape before the transformation. In any case, there is a possibility that the boundary point is not detected, or that the boundary point is detected at a location that is not suitable. Therefore, at the step S71, the inner product of the normal vector for the vertex "v" and the normal vector for the search point is calculated, and when the inner product is less than 0 (in other words, when the angle between normal vectors is greater than 90 degrees), the search point is determined to have passed through the shape before the transformation.

Returning to the explanation of FIG. 11, when it is determined that the search point passed through the shape before the transformation (step S71: YES route), it is not possible to detect a suitable boundary point, so the processing returns to the calling-source processing. On the other hand, when it is determined that the search point does not pass through the shape before the transformation (step S71: NO route), the boundary point search unit 109 compares the brightness value in the voxel space, which corresponds to the search point, with the brightness value in the voxel space, which corresponds to the vertex "v", and determines whether or not the brightness value has changed meaningfully (step S73). At the step S73, it is determined whether or not the following equation is satisfied.

$$f(v) \neq f(v+kn(v))$$

Then, when it is determined that the brightness value did not change meaningfully (step S73: NO route), the boundary point search unit 109 increments the coefficient k as k=k+1 (step S75), and the processing returns to the processing of the step S67.

Figure 16:
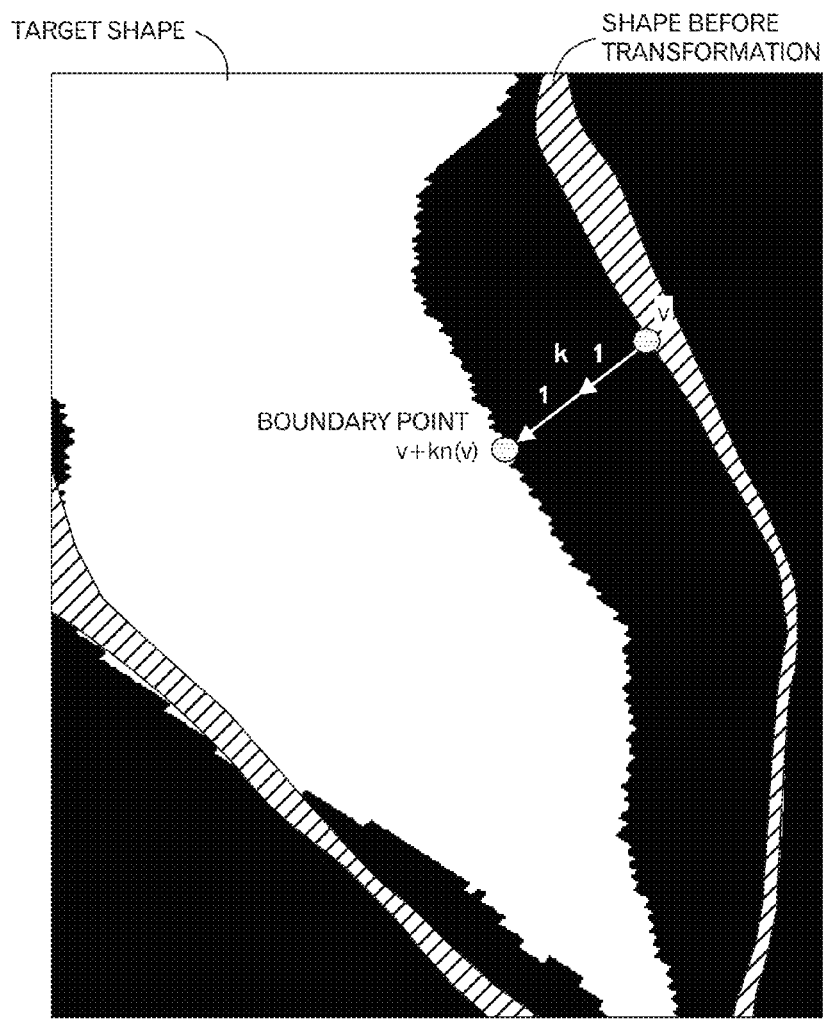
FIG. 16 is a diagram to explain a search method of the boundary point.

In this way, as illustrated in FIG. 16, it is possible to determine whether or not there is a boundary point while moving the search point one voxel at a time in the normal direction from the vertex "v".

On the other hand, when it is determined that the brightness value has changed meaningfully (step S73: YES route), the boundary point search unit 109 sets the search point as a boundary point (step S77). At the step S77, data for the search point (for example, the value of k) is stored in a memory device such as a main memory. Then, the processing returns to the calling-source processing.

In regards to this, the processing that is carried out at the step S63 when it is determined that the vertex "v" is located on the outside of the target shape (step S63: NO route) will be explained. The processing in this case differs only in the direction of the search, so the contents of the basic processing is as described above. In other words, the processing of the step S79 is the same as the processing of the step S65, the processing of the step S81 is the same as the processing of the step S67, the processing of the step S83 is the same as the processing of the step S69, the processing of the step S85 is the same as the processing of the step S71, and the processing of the step S87 is the same as the processing of the step S73. Therefore, detailed explanations of the processing from step S79 to step S87 are omitted.

Then, at the step S89, the boundary point search unit 109 decrements the coefficient k as k=k−1 (step S89), and the processing returns to the processing of the step S81. As a result, the search point is moved one voxel at a time in the normal direction from the outside of the target shape toward the inside. In addition, the processing of the step S91 is the same as the processing of the step S77.

By carrying out the processing such as described above, it becomes possible to detect the crossing point (in other words, boundary point) between the normal line with respect to the vertex "v" and the target shape.

Returning to the explanation of FIG. 10, the setting unit 108 determines whether or not a boundary point was detected by the boundary point search unit 109 (step S47). When it is determined that a boundary point was not detected (step S47: NO route), the processing returns to the calling-source processing in order to carry out a processing for the next vertex.

On the other hand, when it is determined that a boundary point was detected (step S47: YES route), the setting unit 108 sets an internal dividing point on the line segment that connects the vertex "v" and the boundary point "v+kn(v)" as a target landmark (step S49). More specifically, a point as described below is set as the target landmark.

$$v + \frac{t}{T} kn(v)$$

Then, the setting unit 108 sets the vertex "v" as a source landmark (step S51). The setting unit 108 stores the data for the set source landmark and the target landmark in the second landmark data storage unit 110. Then, the processing returns to the calling-source processing.

By carrying out the processing such as described above, it is possible to set an internal dividing point on the line segment that connects a vertex in the shape before the transformation and a boundary point in the target shape as a target landmark.

Returning to the explanation of FIG. 9, the secondary transformation unit 107 determines whether or not m<N is satisfied for the variable m (step S29). Here, N is the total number of vertices in the shape after the primary transformation (or the shape after transforming the shape after the primary transformation). When it is determined that m<N is satisfied (step S29: YES route), the processing returns to the processing of the step S25 in order to carry out the processing for the next vertex.

On the other hand, when it is determined m<N is not satisfied for the variable m (step S29: NO route), the secondary transformation unit 107 carries out the transformation based on the TPS Warp according to the data for the source landmarks and target landmarks that are stored in the second landmark data storage unit 110, and stores the data for the transformed shape in the primary transformation data storage unit 104 (step S31). As described above, in the transformation processing at the step S31, a point that was a source landmark in the primary transformation processing is handled as a fixed point and is not moved.

The secondary transformation unit 107 then determines whether t<T is satisfied for variable t (step S33). When it is determined that t<T is satisfied (step S33: YES route), the processing returns to the processing of the step S23 in order to carry out further transformation processing. Here, T is the total number of times of the transformation, and may be set beforehand by an administrator (for example, T=500).

On the other hand, when it is determined t<T is not satisfied for variable t (step S33: NO route), the transformation has been carried out T times, so the secondary transformation unit 107 stores the data for the shape after the secondary transformation processing in the secondary transformation data storage unit 111, and the processing returns to the calling-source processing.

By carrying out the processing such as described above, the shape after the primary transformation approaches the target shape, and it becomes possible to obtain 3-dimensional shape data having high precision. Moreover, with such a kind of transformation method, the processing time becomes comparatively short.

Returning to the explanation of FIG. 2, after the secondary transformation processing has been carried out, the display unit 112 displays the data stored in the secondary transformation data storage unit 111 on the display device or the like (step S5). The processing then ends.

Figure 17:
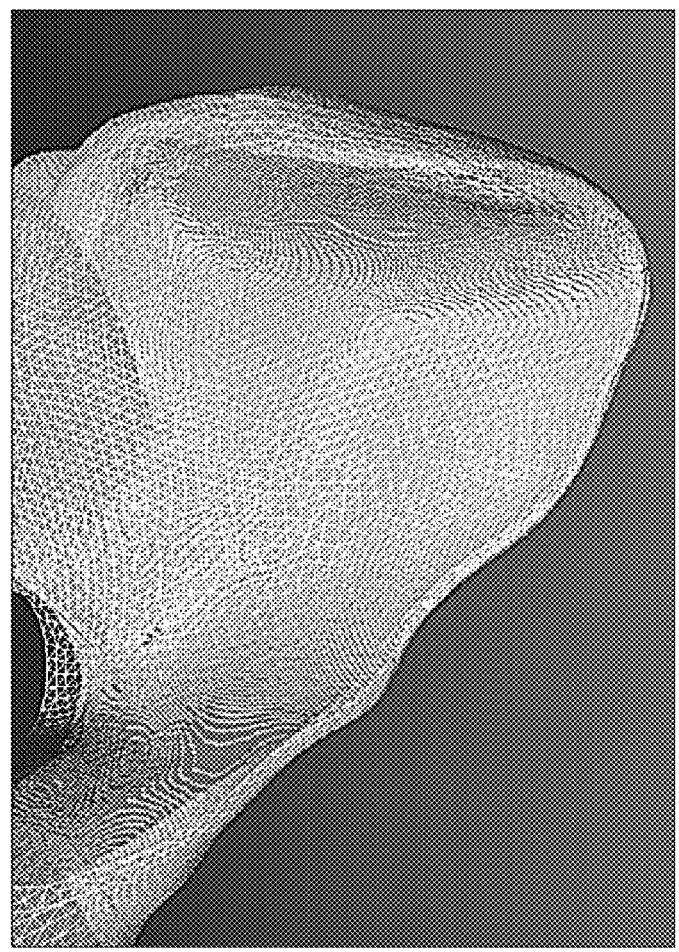
FIG. 17 is a diagram depicting a shape after the secondary transformation and the target shape.
Figure 17:
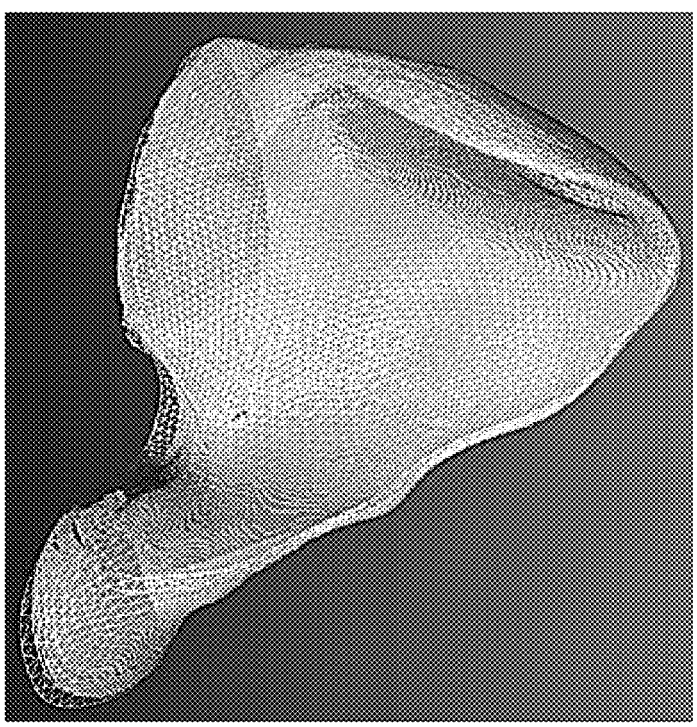

FIG. 17 illustrates an example of data that is displayed on the display device. In the example in FIG. 17, the target shape and the shape after the secondary transformation, which is indicated by mesh lines, are displayed. The figure on the left side is a figure illustrating the entire transformed portion, and the figure on the right side is an enlarged view of part of the transformed portion.

By carrying out the processing such as described above, the reference shape of the heart is transformed so as to approach the target shape that is specified by the segment image data, and it is possible to obtain highly precise 3-dimensional data.

Although the embodiment of this technique was explained above, this technique is not limited to this embodiment. For example, the functional block diagram of the shape data generation apparatus 1 explained above does not necessarily have to correspond to an actual program module configuration.

Moreover, in the processing flow explained above, the order of steps may be changed as long as the processing results do not change. Furthermore, as long as the processing results do not change, the steps may be executed in parallel.

In the example described above, the segment image data is displayed on the landmark setting screen to set the target landmarks. However, for example, tomographic images such as CT images may be displayed to set the target landmarks.

The processing such as described above is not only applicable to the heart, but can also be applied to other objects.

Figure 18:
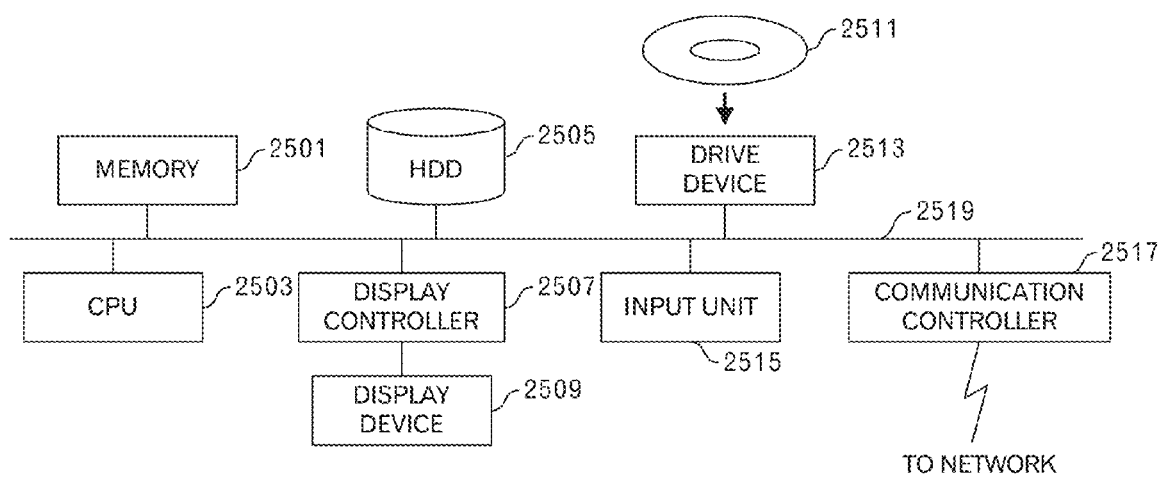
FIG. 18 is a functional block diagram of a computer.

In addition, the aforementioned shape data generation apparatus 1 is computer device as shown in FIG. 18. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 18. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

Incidentally, the respective processing units illustrated in FIG. 1 may be realized by combinations of the CPU 2503 and program, in other words, by executing, by the CPU 2503, the program. More specifically, the CPU 2503 carries out operations according to the program stored in the HDD 2505 or memory 2501 to function as the aforementioned processing units. Moreover, the respective data storage units illustrated in FIG. 1 may be realized by the memory 2501 or HDD 2505 in FIG. 18.

The aforementioned embodiment is summarized as follows:

A shape data generation method relating to this embodiment includes (A) identifying one or plural first vertices satisfying a predetermined condition including a certain condition, from among vertices of a first shape to be transformed, wherein data concerning the vertices of the first shape is stored in a shape data storage unit, and the certain condition is a condition that a normal line of a vertex to be processed crosses with a second shape identified by tomographic image data stored in an image data storage unit; (B) transforming the first shape so as to move each of the one or plural vertices toward a corresponding normal direction of the identified first vertex a predetermined distance, and storing data concerning the vertices of the first shape after the transforming into the shape data storage unit; and (C) storing data concerning the vertices of the first shape transformed by executing the identifying and the transforming the predetermined number of times, into an output data storage unit.

When the first shape is gradually transformed so as to approach the second shape by this processing, an unnatural portion does not easily occur in the shape after the transformation, and it becomes possible to generate shape data with high accuracy. Furthermore, when such a processing is carried out, it becomes possible to generate the shape data in relatively short time.

Moreover, the aforementioned predetermined condition may include a condition the vertex to be processed is far from any one of the one or plural first vertices a second predetermined distance or more. By doing so, because the portion to be transformed does not become biased, the shape after the transformation become smooth, and it becomes possible to generate more accurate shape data.

Furthermore, the aforementioned method may further include: (D) displaying data stored in a reference shape data storage unit storing data of vertices of a reference shape of an object relating to the first shape and the second shape, and data of the second shape, and accepting designation of a start position in the reference shape and designation of a target point corresponding to the start point in the second shape; and (E) generating the first shape by transforming the reference shape so as to place the start point on the target point, and storing data concerning vertices of the reference shape after the transformation into the shape data storage unit. Thus, because it is possible to make the first shape resemble the second shape in advance, the later transformation can be carried out effectively.

Moreover, the predetermined condition described above may include a condition that the vertex to be processed is not the start point, and the transforming is carried out not so as to move the start point. By fixing the position of the start point not to slip it from the target point, it becomes possible to make the first shape closely resemble the second shape.

In addition, the aforementioned identifying may include (a1) moving the vertex to be processed to a normal direction of the vertex to be processed a predetermined third distance; (a2) determining whether or not a moving destination point is included in a voxel space identified from the image data; (a3) upon determining that the moving destination point is included in the voxel space, determining based on an inner product of a normal vector of the vertex to be processed and a normal vector of the moving destination point, whether or not the moving destination point passes through the first shape; (a4) upon determining that the moving destination vertex does not pass through the first shape, comparing a brightness value at the moving destination point with a brightness value at the vertex to be processed to determine whether or not the brightness value changes; (a5) upon determining that the brightness value changes, determining that the condition that the normal line of the vertex to be processed crosses with the second shape is satisfied; (a6) upon determining that the moving destination point is not included in the voxel space or upon determining that the moving destination point passes through the first shape, determining that the condition that the normal line of the vertex to be processed crosses with the second shape is not satisfied; and (a7) upon determining that the brightness value does not change, executing the moving and subsequent processing again for the moving destination point. Thus, it becomes possible to properly determine whether or not the normal line of the first vertex crosses with the second shape.

Moreover, an object relating to the first shape and the second shape may be a heart, and a portion to which the start point and the target point are designated may be at least one of annular valves, an apex, a bottom section of a right ventricle fluid surface, a myocardial boundary, a pulmonary vein, and an inferior vena cava of the heart. By aligning positions in the characteristic portion of the heart, it becomes possible to make the first shape closely resemble the second shape, easily.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a shape data generation process, the shape data generation process comprising:

accepting designation of a start point in a reference shape identified from data of predefined vertices and designation of a target point corresponding to the start point in a first shape that is identified from image data and is a target shape of transformation, wherein an object relating to the reference shape and the first shape is a heart, and a portion to which the start point and the target point are designated is at least one of an apex, a bottom section of a right ventricle fluid surface, a myocardial boundary, a pulmonary vein, and an inferior vena cava of the heart;

generating a second shape, by first transforming the reference shape so as to place the start point on the target point;

identifying, from among a plurality of vertices of the second shape, one or plural first vertices satisfying a predetermined condition including a first condition that a normal line of a vertex to be processed includes a boundary point on the first shape, a second condition that a distance between the vertex to be processed and any other vertex of the one or plural first vertices is a predetermined first distance or more, and a third condition that the vertex to be processed does not correspond to the start point;

second transforming the second shape so as to move each of the one or plural first vertices to a point that is located on the normal line, wherein the point is located from the first vertex at a second distance calculated by multiplying a distance between the first vertex and the boundary point by a ratio of a number of times of transformation already performed to a total number of times of transformation, and the second transforming is performed so as not to move the start point; and storing data concerning the plurality of vertices of the transformed second shape after the identifying and the second transforming are executed the total number of times of transformation.

2. The computer-readable, non-transitory storage medium as set forth in claim 1, wherein the identifying comprises:

moving the vertex to be processed to a point of destination that is located on a normal line of the vertex to be processed, wherein a distance between the vertex to be processed and the point of destination is a predetermined third distance;

determining whether the point of destination is included in a voxel space identified from the image data;

upon determining that the point of destination is included in the voxel space, determining based on an inner product of a normal vector of the vertex to be processed and a normal vector of the point of destination, whether the point of destination passes through the second shape;

upon determining that the point of destination does not pass through the second shape, comparing a brightness value at the point of destination with a brightness value at the vertex to be processed to determine whether the brightness value changes;

upon determining that the brightness value changes, determining that the first condition that the normal line of the vertex to be processed includes the boundary point on the first shape is satisfied;

upon determining that the point of destination is not included in the voxel space or upon determining that the point of destination passes through the second shape, determining that the first condition that the normal line of the vertex to be processed includes the boundary point on the first shape is not satisfied; and upon determining that the brightness value does not change, executing the moving and subsequent processing again for the point of destination.

3. A shape data generation method, comprising:

accepting, by using a computer, designation of a start point in a reference shape identified from data of predefined vertices and designation of a target point corresponding to the start point in a first shape that is identified from image data and is a target shape of transformation, wherein an object relating to the reference shape and the first shape is a heart, and a portion to which the start point and the target point are designated is at least one of an apex, a bottom section of a right ventricle fluid surface, a myocardial boundary, a pulmonary vein, and an inferior vena cava of the heart;

generating, by using the computer, a second shape, by first transforming the reference shape so as to place the start point on the target point;

identifying, by using the computer, from among a plurality of vertices of the second shape, one or plural first vertices satisfying a predetermined condition including a condition that a normal line of a vertex to be processed includes a boundary point on the first shape, a second condition that a distance between the vertex to be processed and any other vertex of the one or plural first vertices is a predetermined first distance or more, and a third condition that the vertex to be processed does not correspond to the start point;

second transforming, by using the computer, the second shape so as to move each of the one or plural identified first vertices to a point that is located on the normal line, wherein the point is located from the first vertex at a second distance calculated by multiplying a distance between the first vertex and the boundary point by a ratio of a number of times of transformation already performed to a total number of times of transformation, and the second transforming is performed so as not to move the start point; and storing, by using the computer, data concerning the plurality of vertices of the transformed second shape after the identifying and the second transforming are executed the total number of times of transformation.

4. A shape data generation apparatus, comprising:

a memory;

a processor configured to use the memory and execute a process, the process comprising:

accepting designation of a start point in a reference shape identified from data of predefined vertices and designation of a target point corresponding to the start point in a first shape that is identified from image data and is a target shape of transformation, wherein an object relating to the reference shape and the first shape is a heart, and a portion to which the start point and the target point are designated is at least one of an apex, a bottom section of a right ventricle fluid surface, a myocardial boundary, a pulmonary vein, and an inferior vena cava of the heart;

generating a second shape, by first transforming the reference shape so as to place the start point on the target point;

identifying, from among a plurality of vertices of the second shape, one or plural first vertices satisfying a predetermined condition including a condition that a normal line of a vertex to be processed includes a boundary point on the first shape, a second condition that a distance between the vertex to be processed and any other vertex of the one or plural first vertices is a predetermined first distance or more, and a third condition that the vertex to be processed does not correspond to the start point;

second transforming the second shape so as to move each of the one or plural identified first vertices to a point that is located on the normal line, wherein the point is located from the first vertex at a second distance calculated by multiplying a distance between the first vertex and the boundary point by a ratio of a number of times of transformation already performed to a total number of times of transformation, and the second transforming is performed so as not to move the start point; and storing data concerning the plurality of vertices of the transformed second shape after the identifying and the second transforming are executed the total number of times of transformation.

* * * * *